United States Patent
Ohtani et al.

(10) Patent No.: US 6,198,618 B1
(45) Date of Patent: Mar. 6, 2001

(54) CONDUCTIVE PASTE AND CERAMIC ELECTRONIC PART INCLUDING THE SAME

(75) Inventors: Akira Ohtani; Masaki Fujiyama, both of Shiga-ken (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/314,382

(22) Filed: May 19, 1999

(30) Foreign Application Priority Data

May 19, 1998 (JP) .................................................. 10-155283

(51) Int. Cl.$^7$ ............................. H01G 4/228; H01G 2/20; C03C 8/18
(52) U.S. Cl. ................................. 361/306.3; 361/308.1; 361/301.4; 501/19
(58) Field of Search ................................. 361/306.1, 306.3, 361/308.1, 301.4, 309–311; 252/518.1; 501/19

(56) References Cited

U.S. PATENT DOCUMENTS

| | | | | |
|---|---|---|---|---|
| 4,808,770 | * | 2/1989 | Prabhu et al. | 174/257 |
| 5,107,394 | * | 4/1992 | Naito et al. | 361/309 |
| 5,346,651 | * | 9/1994 | Oprosky | 252/514 |
| 5,492,653 | * | 2/1996 | Hochheimer et al. | 252/514 |
| 5,658,499 | * | 8/1997 | Steinbeig et al. | 252/514 |
| 5,707,555 | * | 1/1998 | Ohtani | 252/514 |

FOREIGN PATENT DOCUMENTS

| | | | |
|---|---|---|---|
| 10-106346 | * | 4/1998 | (JP) .................................. H01B/1/16 |
| 10-340622 | | 12/1998 | (JP) . |

* cited by examiner

*Primary Examiner*—Kristine Kincaid
*Assistant Examiner*—Eric W. Thomas
(74) *Attorney, Agent, or Firm*—Ostrolenk, Faber, Gerb & Soffen, LLP

(57) ABSTRACT

Provided is a conductive paste, including a metal powder, glass frit and $SiO_2$ dispersed in an organic vehicle in which the compounding ratio of $SiO_2$ is in the range of 0.3 to 1.5% by weight. The conductive paste can prevent scattering of a solder plating film formed on a thick film electrode during surface mounting of a ceramic electronic part including a thick film electrode (an external electrode) which is formed by coating the ceramic electronic part with the conductive paste and baking.

16 Claims, 1 Drawing Sheet

FIG. 1 PRIOR ART
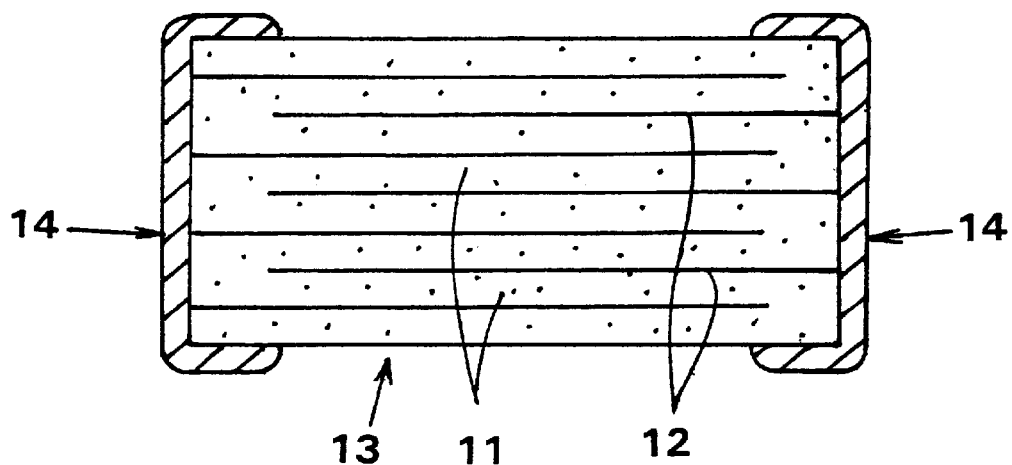
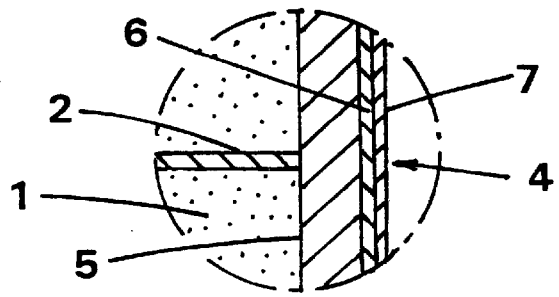
FIG. 2A
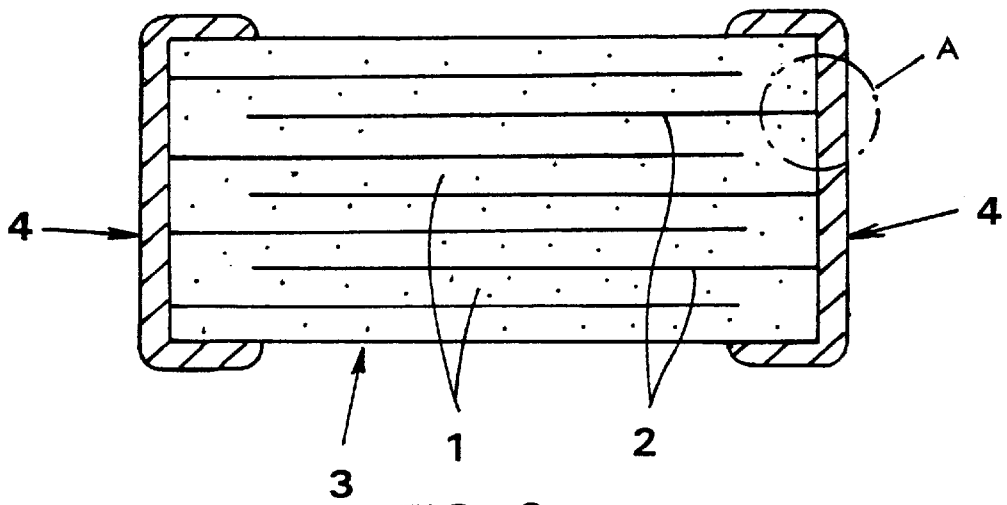
FIG. 2

CONDUCTIVE PASTE AND CERAMIC ELECTRONIC PART INCLUDING THE SAME

BACKGROUND OF THE INVENTION

1. Field of the Invention

The present invention relates to conductive paste used for forming a thick film electrode and the like, and a ceramic electronic part comprising an electrode formed by using the conductive paste.

2. Description of the Related Art

A typical example of an electronic part having a structure in which an external electrode is provided on a ceramic element assembly is a monolithic ceramic capacitor as shown in FIG. 1.

The monolithic ceramic capacitor comprises a ceramic element assembly (capacitor body) 13 formed by alternately laminating a ceramic layer 11 as a dielectric layer and an internal electrode 12, and then sintering the resultant laminate; and external electrodes 14 arranged on both sides of the ceramic element assembly 13 so as to cause conduction with the internal electrodes 12.

The internal electrodes 12 are formed by using a conductive paste which can be burned with ceramic and which contains a metal powder of Pd, Ag-Pd or the like as a conductive component.

The external electrodes 14 are formed by coating a conductive paste on the burned ceramic element assembly 13 and then burning the paste. As the conductive paste for forming the external electrodes (referred to as "the external electrode bodies" or "the thick film electrodes" hereinafter) 14 used has been a metal powder of Ag, Ag-Pd or the like, and zinc borosilicate glass frit dispersed in an organic vehicle.

In order to improve the heat resistance and solderability of the external electrodes, the surfaces of the external electrode bodies (the thick film electrodes) formed by baking the conductive paste are plated with nickel, tin or solder to form plating films of nickel, tin or solder on the thick film electrodes.

In order to prevent the occurrence of a tombstone phenomenon during mounting, a ceramic element assembly having small dimensions is often plated with solder to form solder plating films on the outermost layers of the external electrode bodies (the thick film electrodes).

The above-described monolithic ceramic capacitor is generally surface-mounted by soldering the external electrodes to a land of a wiring board. However, the solder plating film on the outermost layer is re-melted by the heat generated by soldering during mounting, and at the same time, the melted solder plating film is scattered due to bumping (violent escape) of the moisture trapped in the external electrode bodies during the plating step in the formation of the external electrodes, thereby causing a short-circuit with adjacent mounted electronic parts in some circumstances. The above-described problem is true for not only the case in which the outermost layer is plated with solder, but also the case of a ceramic electronic part in which a plating film of any of various low melting point materials such as tin and the like is formed.

SUMMARY OF THE INVENTION

The present invention has been achieved for solving the above problem, and an object of the present invention is to provide conductive paste which can prevent scattering of a plating film, such as a solder plating film, which is formed on a thick film electrode, during surface mounting of a ceramic electronic part comprising the thick film electrode (an external electrode or the like) formed by using the conductive paste, and a ceramic electronic part manufactured by using the conductive paste.

One preferred embodiment of the present invention provides a conductive paste, comprising: a metal powder, a glass frit and $SiO_2$ dispersed in an organic vehicle where the compounding ratio of $SiO_2$ is in the range of about 0.3 to 1.5% by weight.

The about 0.3 to 1.5% by weight of $SiO_2$ is mixed with the conductive paste containing the metal powder and the glass frit, which are dispersed in the organic vehicle, so that the vacancies (in which moisture is trapped during plating) produced in the thick film electrode formed by baking the conductive paste are filled with a single $SiO_2$ material or a complex of $SiO_2$ and glass frit, thereby suppressing the entrance of moisture in the thick film electrode. As a result, during surface mounting of a ceramic electronic part comprising the thick film electrode (the external electrode or the like) formed by using the conductive paste, moisture bumping in the thick film electrode due to the heat generated during mounting can be suppressed, and thus scattering of the plating film such as the solder plating film formed on the thick film electrode can be suppressed and prevented.

In the above described conductive paste, the reason why the compounding ratio of $SiO_2$ is about 0.3 to 1.5% by weight is that with a $SiO_2$ compounding ratio of less than about 0.3% by weight, the effect of filling the vacancies produced in the thick film electrode, which is formed by baking the conductive paste, becomes insufficient, while with a $SiO_2$ compounding ratio of over about 1.5% by weight, it is undesirably difficult to increase the thickness of the plating film, for example, when a Ni plating film is formed on the thick film electrode formed by baking the conductive paste.

The compounding ratio of $SiO_2$ is more preferably about 0.5 to 1.2% by weight.

In the above described conductive paste, the average particle diameter of $SiO_2$ is preferably about 0.1 $\mu$m or less.

By using $SiO_2$ having an average particle diameter of about 0.1 $\mu$m or less, it is possible to securely fill the vacancies of the thick film electrode, which is formed on a predetermined object such as an electronic part or the like by coating and baking, and suppress trapping of moisture in the thick film electrode. The reason why the average particle diameter of $SiO_2$ is about 0.1 $\mu$m or less is that with an average particle diameter of over about 0.1 $\mu$m, little $SiO_2$ undesirably enters the vacancies.

$SiO_2$ having an average particle diameter of about 0.02 to 0.05 $\mu$m is more preferably used.

In the above described conductive paste, a glass frit having a glass transition point of about 300 to 600° C. is employed as the glass frit.

The reason why glass frit having a glass transition point of about 300 to 600° C. is used as the glass frit is that the use of a glass frit having a glass transition point of less than about 300° C. causes over-sintering of the electrode and deterioration in mechanical strength, while the use of glass frit having a glass transition point of over about 600° C. possibly causes insufficient sintering of the electrode and deterioration in reliability. The use of a glass frit having the glass transition point of about 300 to 600° C. permits more secure filling of the vacancies produced in the thick film electrode with a complex of $SiO_2$ and the glass frit, making the present invention more effective.

In the above described conductive paste, zinc borosilicate glass frit may be used as the glass frit. The use of zinc borosilicate glass frit as the glass frit permits efficient filling of the vacancies produced in the thick film electrode, which is formed on a predetermined object such as an electronic part or the like by coating and baking, without deteriorating sinterability, thereby suppressing the entrance of moisture in the thick film electrode, and making the present invention more effective.

Another preferred embodiment of the present invention provides a ceramic electronic comprising: a ceramic element assembly; and an external electrode comprising a thick film electrode provided on the ceramic element assembly; wherein the external electrode is formed by plating the thick film electrode provided by coating and baking the above described conductive paste.

In the ceramic electronic part comprising the external electrode formed by plating the thick film electrode, which is formed by coating and baking the conductive paste of the present invention, the vacancies produced in the thick film electrode are filled with a $SiO_2$ single material or a complex of $SiO_2$ and glass frit, suppressing the entrance of moisture in the thick film electrode. As a result, it is possible to suppress bumping of the moisture in the thick film electrode, which constitutes the external electrode, due to the heat generated in mounting, and thus suppress and prevent scattering of the plating film such as the solder plating film formed on the thick film electrode.

In the above described ceramic electronic part, the external electrode may be formed by:

(a) Ni plating on the thick film electrode and further tin plating thereon; or (b) Ni plating on the thick film electrode and further solder plating thereon.

For the external electrode of a ceramic electronic part such as a monolithic ceramic capacitor or the like, a plating film such as a nickel plating film, a tin plating film, a solder plating film or the like is often formed on an external electrode body (thick film electrode) by an electroplating method or the like in order to improve heat resistance and solderability. In such a case, the formation of the external electrode body (thick film electrode) by using the conductive paste of the present invention securely prevents scattering of the plating film formed on the electrode body and thus permits the achievement of a ceramic electronic part having excellent heat resistance and solderability.

Other features and advantages of the present invention will become apparent from the following description of the invention which refers to the accompanying drawings.

BRIEF DESCRIPTION OF THE DRAWINGS

FIG. 1 is a sectional view showing a conventional ceramic electronic part (monolithic ceramic capacitor).

FIG. 2 is a sectional view showing a ceramic electronic part (monolithic ceramic capacitor) in accordance with one preferred embodiment of the present invention.

DESCRIPTION OF THE PREFERRED EMBODIMENT

This preferred embodiment shows that an external electrode of the monolithic ceramic capacitor shown in FIG. 2 is formed by using conductive paste of the present invention.

The monolithic ceramic capacitor comprises a ceramic element assembly (capacitor body) 3, which is formed by alternately laminating a ceramic layer 1 as a dielectric layer and an internal electrode 2, and then burning, and external electrodes 4 formed on both ends of the ceramic element assembly 3 to cause conduction with the internal electrodes 2, wherein the internal electrodes 2 are formed by using conductive paste containing as a conductive component, a metal powder of Pd, Ag-Pd or the like, which can be burned with ceramic.

The external electrodes 4 are formed by providing a Ni plating film 6 and a solder plating film 7 on external electrode bodies (thick film electrodes) 5 formed by baking a conductive paste. The Ni plating film 6 and the solder plating film 7 formed thereon are provided for improving the heat resistance and solderability of the external electrodes 4.

The conductive paste used for forming the external electrodes of the monolithic ceramic capacitor is formed by dispersing a metal power, glass frit and $SiO_2$ powder in an organic vehicle.

As the metal powder as a conductive component, an Ag powder was used.

As the organic vehicle, a composition containing a cellulose resin as a resin component and butylcarbitol as a solvent component was used.

As the glass frit, two zinc borosilicate glass frit types from CaO, ZnO, $B_2O_3$, $SiO_2$, $Na_2O$ and $Al_2O_3$, as shown by characters A and B in Table 1 were used. The glass frit A has a glass transition point of 508° C., and the glass frit B has a glass transition point of 495° C.

TABLE 1

| Type of glass frit | Component Ratio of Glass Frit (% by weight) | | | | | |
| --- | --- | --- | --- | --- | --- | --- |
| | CaO | ZnO | $B_2O_3$ | $SiO_2$ | $Na_2O$ | $Al_2O_3$ |
| A | 8.5 | 32.0 | 28.0 | 24.0 | 5.5 | 2.0 |
| B | 12.0 | 5.0 | 25.0 | 45.0 | 10.0 | 3.0 |

$SiO_2$ having an average particle diameter of 0.1 μm or less, and particularly having the average particle diameters shown in Table 2 was combined with glass frit A or B to prepare the conductive pastes of each of Sample Nos. 1 to 9.

The total of the Ag powder and the glass frit was 75% by weight based on the total of the conductive paste.

The compounding ratio by weight of Ag powder to glass frit was 100:4.

TABLE 2

| Sample No. | Type of glass frit | $SiO_2$ | | Incidence of scattering of solder plating film (/1000) |
| --- | --- | --- | --- | --- |
| | | Amount (% by weight) | Average particle diameter (μm) | |
| 1 | A | 0 | — | 32 |
| 2 | A | 0.3 | 0.04 | 10 |
| 3 | A | 0.8 | 0.04 | 3 |
| 4 | A | 1.2 | 0.04 | 1 |
| 5 | A | 1.8 | 0.04 | 2 |
| 6 | A | 0.8 | 0.30 | 19 |
| 7 | B | 0 | — | 35 |
| 8 | B | 0.8 | 0.08 | 3 |
| 9 | B | 1.2 | 0.08 | 2 |

Of Sample Nos. 1 to 9 shown in Table 2, Samples 1 and 7 (Conventional Examples) are glass frit having a conventional composition not containing $SiO_2$, and Sample Nos. 5 and 6 (Comparative Examples) are glass frit containing $SiO_2$ in a ratio beyond the range of the present invention.

The method of producing the monolithic ceramic capacitor shown in FIG. 2 will be briefly described.

First, a conductive paste for forming an internal electrode is coated in a predetermined pattern on a green sheet comprising a dielectric ceramic such as barium titanate ceramic by a screen printing method or the like. A predetermined number of the green sheets are laminated, compressed and then cut in a predetermined shape having predetermined dimensions to obtain a ceramic element assembly. The thus-obtained ceramic element assembly is burned under predetermined conditions.

The conductive paste for forming the external electrodes, which contains each glass frit shown in Table 1, is coated on both end sides of the resultant capacitor body (ceramic element assembly) 3 by dip coating, and then baked by heat treatment under conditions in which it is maintained at a peak temperature of 700 to 800° C. for 10 minutes, to form the external electrode bodies (the thick film electrodes) 5.

Then, a Ni plating film 6 is formed on the external electrode bodies 5 by Ni electroplating, and a solder plating film 7 is formed on the Ni plating film 6 by solder electroplating to obtain the monolithic ceramic capacitor comprising the external electrodes 4 having the three-layer structure shown in FIG. 2.

The solder plating film of the thus-obtained monolithic ceramic capacitor was subjected to a scattering test. The results are also shown in Table 2.

In the scattering test of the solder plating film, 1000 capacitors were placed on a glass-epoxy substrate and then heated to 240° C. to examine the number of monolithic ceramic capacitors in which the solder plating film of the outermost layer exhibited scatter. In Table 2, each of the numerical values indicates the number of monolithic ceramic capacitors in which the solder plating film was scattered relative to 1000 samples.

Table 2 shows that in the samples (monolithic ceramic capacitors) comprising the external electrode bodies 5 respectively formed by using the conductive paste sample Nos. 1 and 7 not containing $SiO_2$, scattering of the solder plating film was observed in 32 capacitors and 35 capacitors, respectively, of 1000 samples. On the other hand, in Samples 2 to 4, 8 and 9 comprising the external electrode bodies 5 formed by using the conductive paste containing $SiO_2$, scattering of the solder plating film was observed in only 10 or less capacitors of 1000 samples. This indicates improvement in characteristics.

In Sample 6 comprising the external electrode body 5 formed by using the conductive paste containing $SiO_2$ having an average particle diameter of 0.3 $\mu$m, scattering of the solder plating film was observed in 19 capacitors of 1000 samples, thereby have more improved characteristics than Samples 1 and 7. However, the effect of Sample 6 is less than, for example, Sample 3 using conductive paste containing $SiO_2$ having an average particle diameter of 0.04 $\mu$m. As a result, the average particle diameter of $SiO_2$ is preferably in the range of about 0.1 $\mu$m or less.

In Sample No. 5 using the conductive paste containing 1.8% by weight of $SiO_2$, scattering of the solder plate film was observed in only 2 capacitors. However, this sample was found to be undesirable because the thickness of the Ni plating film was lower than the standard value of monolithic ceramic capacitors.

Therefore, the amount of $SiO_2$ added is preferably in the range from about 0.3 to 1.5% by weight.

In the above-described preferred embodiment, description has been made of the case using zinc borosilicate glass frit as an example. However, the present invention is not limited to this glass frit, and for example, zinc borosilicate glass frit containing 10 to 40% by weight of barium borosilicate glass frit, and other types of glass frit or quantities of glass frit can also be used.

In the above described preferred embodiment, description has been made of a case as an example in which the external electrodes of a monolithic ceramic capacitor are formed by using the conductive paste of the present invention. However, application of the conductive paste of the present invention is not limited to this, and for example, the conductive paste can also be used for forming external electrodes of monolithic ceramic resistors such as a NTC thermistor, a varistor and the like.

From other viewpoints, the present invention is not limited to the above-described preferred embodiment, and various applications and modifications can be made in the scope of the gist of the invention.

While the invention has been particularly shown and described with reference to preferred embodiments thereof, it will be understood by those skilled in the art that the forgoing and other changes in form and details may be made therein without departing from the spirit of the invention.

What is claimed is:

1. A conductive paste comprising a metal powder, glass frit and $SiO_2$ dispersed in an organic vehicle, wherein the amount of $SiO_2$ is in the range of about 0.3 to 1.5% by weight and the $SiO_2$ has an average particle diameter of about 0.1 $\mu$m or less.

2. The conductive paste according to claim 1, wherein the glass frit has a glass transition point of about 300 to 600° C.

3. The conductive paste according to claim 2, wherein the glass frit is zinc borosilicate glass frit.

4. The conductive paste according to claim 3, wherein the $SiO_2$ has an average particle diameter of about 0.02–0.05 $\mu$m.

5. The conductive paste according to claim 4, wherein the amount of $SiO_2$ is in the range of about 0.5 to 1.2% by weight.

6. A ceramic electronic part comprising a ceramic element assembly having the conductive paste of claim 5 on a surface thereof.

7. A baked ceramic electronic part of claim 6.

8. The conductive paste according to claim 1, wherein the glass frit is zinc borosilicate glass frit.

9. The conductive paste according to claim 1, wherein the $SiO_2$ has an average particle diameter of about 0.02–0.05 $\mu$m.

10. A ceramic electronic part comprising a ceramic element assembly having the conductive paste of claim 9 on a surface thereof.

11. A baked ceramic electronic part of claim 10 and in which the amount of $SiO_2$ is in the paste in the range of about 0.5 to 1.2% by weight.

12. The conductive paste according to claim 1, wherein the amount of $SiO_2$ is in the range of about 0.5 to 1.2% by weight.

13. A ceramic electronic part comprising a ceramic element assembly having the conductive paste of claim 12 on a surface thereof.

14. A ceramic electronic part comprising a ceramic element assembly having the conductive paste of claim 1 on a surface thereof.

15. A baked ceramic electronic part of claim 14.

16. The baked ceramic electronic part according to claim 15, having Ni plating on the baked paste and further having tin or solder plating on the Ni plating.

* * * * *